US011315363B2

(12) United States Patent
Liu et al.

(10) Patent No.: US 11,315,363 B2
(45) Date of Patent: Apr. 26, 2022

(54) SYSTEMS AND METHODS FOR GAIT RECOGNITION VIA DISENTANGLED REPRESENTATION LEARNING

(71) Applicants: Board of Trustees of Michigan State University, East Lansing, MI (US); Ford Global Technologies, LLC, Dearborn, MI (US)

(72) Inventors: Xiaoming Liu, Okemos, MI (US); Jian Wan, Novi, MI (US); Kwaku Prakah-Asante, Commerce Charter Township, MI (US); Mike Blommer, Ann Arbor, MI (US); Ziyuan Zhang, East Lansing, MI (US); Luan Tran, Grand Rapids, MI (US); Xi Yin, Sunnyvale, CA (US); Yousef Atoum, East Lansing, MI (US)

(73) Assignees: Board of Trustees of Michigan State University, East Lansing, MI (US); Ford Global Technologies LLC, Dearborn, MI (US)

( * ) Notice: Subject to any disclaimer, the term of this patent is extended or adjusted under 35 U.S.C. 154(b) by 0 days.

(21) Appl. No.: 17/155,350

(22) Filed: Jan. 22, 2021

(65) Prior Publication Data
US 2021/0224524 A1 Jul. 22, 2021

Related U.S. Application Data

(60) Provisional application No. 62/964,313, filed on Jan. 22, 2020.

(51) Int. Cl.
*G06V 40/20* (2022.01)
*G06K 9/62* (2022.01)

(52) U.S. Cl.
CPC ............ *G06V 40/25* (2022.01); *G06K 9/623* (2013.01); *G06K 9/6256* (2013.01); *G06K 9/6268* (2013.01)

(58) Field of Classification Search
CPC .... G06V 40/25; G06V 40/168; G06V 40/193; G06V 40/197; G06V 40/23; G06V 40/28; G06K 9/623; G06K 9/6256; G06K 9/6268
See application file for complete search history.

(56) References Cited

U.S. PATENT DOCUMENTS 7,330,566 B2 * 2/2008 Cutler .................... G06V 40/25
382/103
7,397,931 B2 * 7/2008 Imagawa .............. G06F 3/0304
600/595

(Continued)

OTHER PUBLICATIONS

Ebenezer et al., "Gait Verification System Through Multiperson Signature Matching for Unobtrusive Biometric Authentication" (Year: 2019).*

*Primary Examiner* — Manav Seth
(74) *Attorney, Agent, or Firm* — Harness Dickey & Pierce PLC (57) ABSTRACT

Gait, the walking pattern of individuals, is one of the most important biometrics modalities. Most of the existing gait recognition methods take silhouettes or articulated body models as the gait features. These methods suffer from degraded recognition performance when handling confounding variables, such as clothing, carrying and view angle. To remedy this issue, a novel AutoEncoder framework is presented to explicitly disentangle pose and appearance features from RGB imagery and a long short-term memory integration of pose features over time produces the gait feature.

19 Claims, 5 Drawing Sheets

(56) References Cited

U.S. PATENT DOCUMENTS

| | | | | |
|---|---|---|---|---|
| 7,613,325 B2* | 11/2009 | Iwasaki | ................. | G06T 7/20 |
| | | | | 348/169 |
| 7,711,146 B2* | 5/2010 | Tu | ................. | G06V 40/173 |
| | | | | 348/172 |
| 8,460,220 B2* | 6/2013 | Cuddihy | ................. | G06V 40/25 |
| | | | | 600/595 |
| 9,589,365 B2* | 3/2017 | Zhao | ................. | G06T 7/246 |
| 10,327,671 B2* | 6/2019 | Cheung | ................. | A61B 5/1101 |
| 2013/0204545 A1* | 8/2013 | Solinsky | ................. | G01C 21/16 |
| | | | | 702/44 |
| 2014/0270402 A1* | 9/2014 | Condell | ................. | G06V 40/25 |
| | | | | 382/115 |
| 2020/0205697 A1* | 7/2020 | Zheng | ................. | G06V 40/23 |
| 2021/0346761 A1* | 11/2021 | Sterling | ................. | A63B 24/0006 |
| 2022/0044028 A1* | 2/2022 | Oami | ................. | G06V 20/40 |

* cited by examiner

SYSTEMS AND METHODS FOR GAIT RECOGNITION VIA DISENTANGLED REPRESENTATION LEARNING

CROSS-REFERENCE TO RELATED APPLICATIONS

This application claims the benefit of U.S. Provisional Application No. 62/964,313, filed on Jan. 22, 2020. The entire disclosure of the above application is incorporated herein by reference.

FIELD

The present disclosure relates to gait recognition and, more specifically, to gait recognition implemented as an authentication method.

BACKGROUND

Automatically authenticating a user's identity prior to the user reaching a vehicle door for a ride-sharing service, for example, is of significant value for customer convenience and security. Although biometrics, such as facial features or fingerprints, are widely used to identify a person, gait recognition has the advantage that it can operate at a distance without user cooperation. Additionally, a user's gait is a soft biometric trait, which is relatively difficult to impersonate.

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

This section provides a general summary of the disclosure, and is not a comprehensive disclosure of its full scope or all of its features.

An improved authentication system is presented. The authentication system comprises: a camera, a feature extractor, an aggregator, a classifier and a data store. The camera is configured to capture two or more images of an unknown person walking. The feature extractor is configured to receive the two or more images and, for each image in the two or more images, operates to extract a set of appearance features and a set of pose features, such that the appearance features are indicative of visual appearance of the unknown person and the pose features are indicative of pose of the unknown person. In one embodiment, the feature extractor is a neural network trained to disentangle the pose features from the appearance features. The aggregator is configured to receive multiple sets of pose features from the feature extractor and generate a gait feature for the unknown person. The data store is configured to store a plurality of gait features, where each gait feature in the plurality of gait features is associated with a known person. The classifier is configured to receive the gait feature from the aggregator and operates to identify the unknown person by comparing the gait feature to the plurality of gait features stored in the data store. The authentication system may further include a pre-processor interposed between the camera and the feature extractor which operates to remove background from each of the two or more images.

In one embodiment, the neural network is further defined as a convolutional neural network. The neural network may be trained using cross reconstruction loss. That is, the neural network is trained by comparing a given image from the two or more images with a reconstructed image, where the reconstructed image was reconstructed using a set of pose features from one image in the two or more images and appearance features from another image in the two or more images.

In some embodiments, the aggregator is further defined as a long short-term memory, such that the classifier averages output from the long short-term memory over time.

In other embodiments, the authentication system further includes a verification module and an actuator. The verification module receives an identity for the unknown person from the classifier and actuates the actuator based on the identity of the unknown person.

In another aspect, a computer-implemented method is presented for authenticating a person. The method includes: capturing a video of an unknown person walking; parsing the video into two or more image frames; for each image in the two or more images, disentangling a set of pose features from a set of appearance features, such that the appearance features are indicative of visual appearance of the unknown person and the pose features are indicative of pose of the unknown person; generating a gait feature for the unknown person from the multiple sets of pose features; and identifying the unknown person by comparing the gait feature for the unknown person to a plurality of gait features, where each gait feature in the plurality of gait features is associated with a known person.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

The present disclosure will become more fully understood from the detailed description and the accompanying drawings.

In the drawings, reference numbers may be reused to identify similar and/or identical elements.

DETAILED DESCRIPTION

Pose features of a user provide unique and secure information for user authentication without requesting biometrics during a potential cumbersome explicit authentication request. For example, implemented in a ride share system, a registered user can be verified when walking towards a requested vehicle. The requested vehicle may have cameras mounted at various points surrounding the vehicle and can identify individuals approaching the vehicle. During authentication of an approaching individual, a gait identification system receives videos of the approaching individual and identifies or extracts two sets of features from the approaching individual: appearance and gait. Both features are represented as feature vectors by trained machine learning models.

To ensure that registered users can be properly verified independent of a present outfit the user is wearing, that is, authenticated only based on their pose features, the gait identification system removes appearance from the features extracted from a video of the approaching individual. Therefore, the resulting extracted features only include pose features. The pose features of the approaching user can then be compared to a known or registered user database including pose features for each registered user.

If the pose features of the approaching user match the pose features of the registered user requesting the ride (within a confidence threshold), then the approaching user is authenticated and identified as the requesting user. In response, the requested vehicle may alert the driver that the approaching user is verified. Additionally or alternatively, the authentication of the approaching user may prompt an actuator of the vehicle to unlock one of the doors of the vehicle or open one of the doors of the vehicle.

The walking pattern of individuals or gait is one of the most important biometrics modalities, which allows it to be used as an authentication metric. Most of the existing gait recognition methods take silhouettes or articulated body models as the pose features. These methods suffer from degraded recognition performance when handling confounding variables, such as clothing, objects being carried, and viewing angle. To remedy these issues, the gait identification system of the present disclosure includes a novel autoencoder framework to explicitly disentangle pose (individual frames of the gait) and appearance features from RGB imagery and long short-term memory (LSTM)-based integration of pose features over time (as captured in a video) to produce a gait feature.

The gait identification system collects a Frontal-View Gait (FVG) dataset to focus on gait recognition from frontal-view walking, which is a challenging problem since frontal-view walking contains minimal gait cues compared to other views. FVG does include other important variations, for example, walking speed, objects being carried, and clothing worn. With that, the gait identification system of the present disclosure demonstrates superior performance to the state of the arts quantitatively, the ability of feature disentanglement qualitatively, and provides promising computational efficiency.

Biometrics measure a user's unique physical and behavioral characteristics to recognize the identity of the user. Gait is one of the biometrics modalities, such as face, fingerprint, and iris. Gait recognition has the advantage that it can operate at a distance without user cooperation. Also, gait is difficult to camouflage. Therefore, authenticating a user's gait is not intrusive, does not require an explicit authentication request or explicit performance of an authentication measurement, and gait is difficult to forge. Due to these advantages, gait recognition is useful for many applications, such as person identification, criminal investigation, and healthcare.

The core of gait recognition lies in extracting gait-related features from the video frames of a walking person, where the prior approaches are categorized into two types: appearance-based and model-based methods. The appearance-based methods, such as gait energy image (GEI) or gait entropy image (GEnI), are defined by extracting silhouette masks. Specifically, GEI uses an averaged silhouette image as the gait representation for a video. These methods are popular in the gait recognition community for their simplicity and effectiveness. However, they often suffer from sizeable intra-subject appearance changes due to covariates including clothing changes, objects being carried, viewing angle changes, and walking speed variations.

While GEI has a low computational cost and can handle low-resolution imagery, GEI can be sensitive to the above-mentioned covariates. In contrast, the model-based method first performs pose estimation and accepts articulated body skeleton as the gait feature. On the other hand, model-based methods fit articulated body models to images and extract kinematic features such as 2D body joints. While they are robust to some covariates such as clothing and speed, they require a relatively higher image resolution for reliable pose estimation and higher computational costs.

Figure 1:
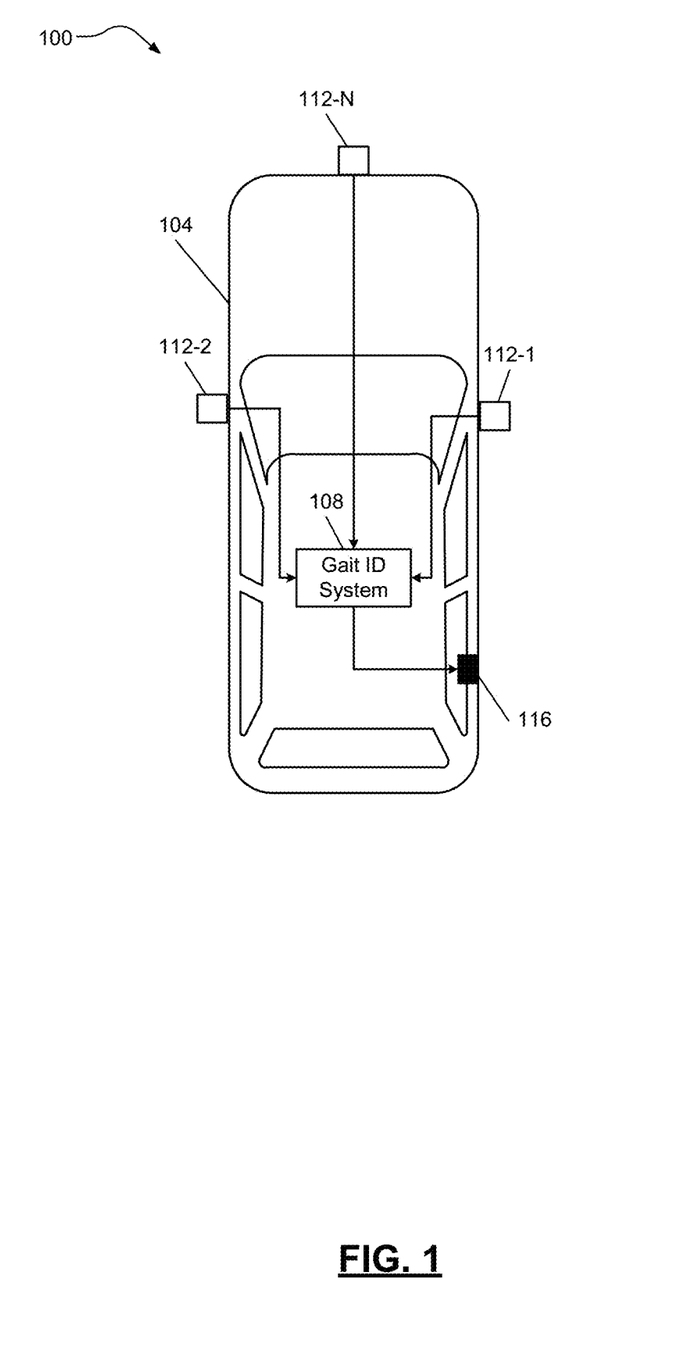
FIG. 1 is an example user authentication system incorporated into a vehicle according to principles of the present disclosure.

Referring to FIG. 1, a user authentication system 100 is shown incorporated into a vehicle 104. The vehicle 104 may be a personal vehicle or registered as a ride share vehicle with a particular service. While the user authentication system 100 of the present disclosure is mainly described as being incorporated into a vehicle being used for ride share services, the user authentication system 100 may be used to authenticate an owner of a personal vehicle, an owner of a structure or building, and additional authentication systems granting access to particular, registered users. The vehicle 104 includes an operating system with a gait identification (ID) system 108. The gait ID system 108 identifies users that are approaching the vehicle 104 and authenticates the user's identity based on their gait. The gait ID system 108 receives video of users around the vehicle 104 from a camera 112-1 or a plurality of cameras 112-1, 112-2, . . . , 112-N, collectively 112, mounted on the vehicle 104. The plurality of cameras 112 may be mounted at various points on the vehicle 104.

The user authentication system 100 may include the plurality of cameras 112 mounted on the vehicle 104, positioned to capture an entirety of the environment surrounding the vehicle 104 (additional cameras capturing entire surrounding environment not shown). In this way, the plurality of cameras 112 can identify users approaching the vehicle 104 from a variety of directions.

The user authentication system 100 also includes an actuator 116. The gait ID system 108, upon authenticating a video stream of an approaching user received from the plurality of cameras 112, instructs the actuator 116 to unlock a rear door of the vehicle 104. In various implementations, the actuator 116 may open the rear door of the vehicle 104. Additionally or alternatively, multiple actuators may be included for each door of the vehicle 104, and the gait ID system 108 may instruct the actuator to unlock or open the door nearest the approaching user. As mentioned previously, authentication of the user may also (or alternatively) result in a notification to the driver's phone or mobile computing device that the user has been authenticated and which camera captured the user, indicating a direction or location of the authenticated user.

The gait ID system 108 includes a novel convolutional neural network (CNN)-based model to automatically learn the disentangled gait feature, or appearance feature, from a walking video of an approaching user to verify and/or register the user. The CNN-based model relies on pose features of a walking user, as opposed to handcrafted GEI, or skeleton-based features. While many conventional gait databases study side-view imagery, the gait ID system 108 collects a new gait database where both gallery and probe are captured in frontal-views. While particular reference is made to convolutional neural networks, it is readily understood that other types of neural networks (e.g., residual neural networks) as well as other types of machine learning also fall within the scope of this disclosure.

It is understandable that the challenge in designing a gait feature is the necessity of being invariant to the appearance variation due to clothing, viewing angle, carrying, etc. Therefore, the gait ID system 108 disentangles the gait feature from the visual appearance of the approaching user. For both appearance-based and model-based methods, disentanglement is achieved by manually handcrafting the GEI or body skeleton, since neither has color information. However, manual disentanglements may lose certain information or create redundant gait information. For example, GEI represents the average contours over time but not the dynamics of how body parts move. Similarly, for the body skeleton, when the approaching user is carrying an item, certain body joints such as hands may have fixed positions and are redundant information to gait.

To remedy the issues in handcrafted features, the gait ID system 108 automatically disentangles the pose features from appearance features and uses the extracted pose features to generate pose features for gait recognition. The pose features are generated by extracting pose features from each frame of a captured video of an approaching user. The disentanglement performed by the gait ID system 108 is realized by designing an autoencoder-based CNN with novel loss functions.

For each video frame, the encoder estimates two latent representations, (i) pose feature representation (that is, frame-based gait feature) and (ii) appearance feature representation, by employing two loss functions. The two loss functions include (i) cross reconstruction loss and (ii) gait similarity loss. The cross reconstruction loss enforces that the appearance feature of one frame, fused with the pose feature of another frame, can be decoded to the latter frame. The gait similarity loss forces a sequence of pose features extracted from a video sequence of the same subject to be similar even under different conditions. Finally, the pose features of a sequence are fed into a multi-layer LSTM with a designed incremental identity loss to generate the sequence-based gait feature, where two of which can use the cosine distance as the video-to-video similarity metric.

Furthermore, most prior work often chose a walking video of a side view, which has the richest gait information, as the gallery sequence. However, other viewing angles, such as the frontal view, can be very common when pedestrians are walking toward or away from a camera, such as the plurality of cameras 112. Prior work also focusing on frontal views are often based on RGB-D videos, which have richer depth information than RGB videos. Therefore, to encourage gait recognition from the frontal-view RGB videos that generally has the minimal amount of gait information, the CNN training videos are high-definition videos to construct the FVG database with a wide range of variations. In various implementations, the FVG database may collect three frontal-view angles where the subject walks from left −45°, 0°, and right 45° off the optical axes of the camera 112-1 or the plurality of cameras 112. For each of three angles, different variants are explicitly captured including walking speed, clothing, carrying, clutter background, etc. Such a robust FVG database results in a more accurate CNN model for disentangling pose and appearance features.

The user authentication system 100 implements the gait ID system 108 to learn gait information from raw RGB video frames, which contain richer information, thus with higher potential of extracting discriminative pose features. The present CNN-based approach has the advantage of being able to leverage a large amount of training data and learning more discriminative representation from data with multiple covariates to create an average gait feature representation from pose features extracted from a plurality of video frames. The present FVG database focuses on the frontal view, with three different near frontal-view angles towards the camera, and other variations including walking speed, carrying, clothing, cluttered background and time.

Figure 2:
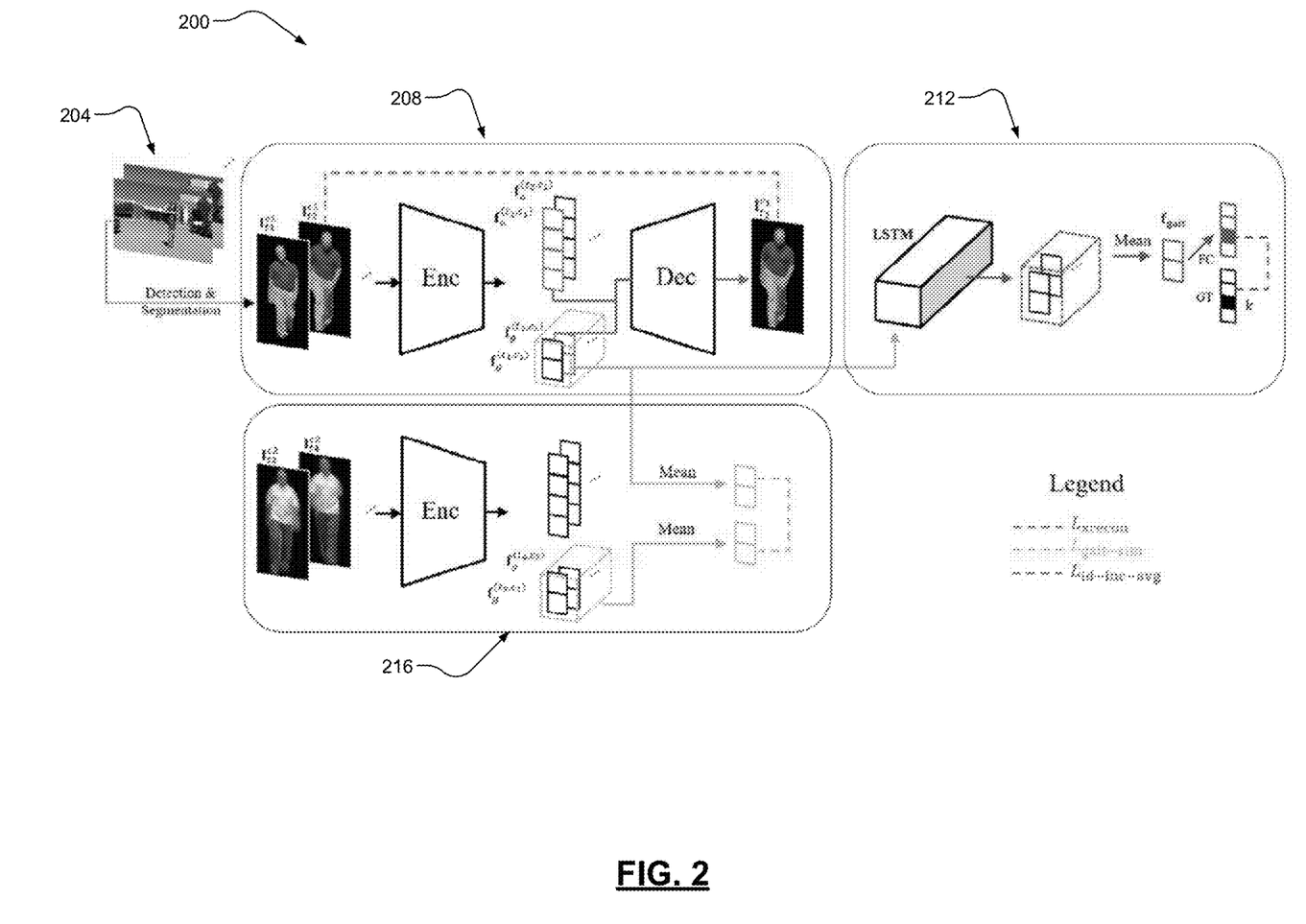
FIG. 2 is an example functional flow diagram depicting example architecture of a gait identification (ID) system according to principles of the present disclosure.

The present method has only one encoder to disentangle the appearance and gait information, as shown in FIG. 2, through the design of novel loss functions without the need for adversarial training. The present method does not require adversarial training, which makes training more accessible. To disentangle gait and appearance feature from the RGB information, there is no gait nor appearance label to be utilized, since the type of walking pattern or clothes cannot be defined as discrete classes.

FIG. 2 is a functional flow diagram depicting the architecture of a gait identification (ID) system 200 of the present disclosure. In an example, assuming there are three videos, where videos 1 and 2 capture subject A wearing a t-shirt and a long down coat, respectively, and in video 3 subject B wears the same long down coat as in video 2. The objective is to design an algorithm, from which the pose features of video 1 and 2 are the same, while those of video 2 and 3 are different. Clearly, this is a challenging objective, as the long down coat can easily dominate the feature extraction, which would make videos 2 and 3 to be more similar than videos 1 and 2 in the latent space of pose features. Indeed, the core challenge, as well as the objective, of gait recognition is to extract pose features that are discriminative among subjects but invariant to different confounding factors, such as viewing angles, walking speeds, and appearance.

The approach of the gait ID system 200 is to achieve the gait feature representation via feature disentanglement by separating the gait feature from appearance information for a given walking video. As shown in FIG. 2, the input to the gait ID system 200 is video frames 204, with background removed using a detection and segmentation method. An encoder-decoder network 208, with carefully designed loss functions, is used to disentangle the appearance and pose features for each video frame. Then, a multi-layer LSTM 212 explores the temporal dynamics of pose features and aggregates them into a sequence-based gait feature for identification purposes.

For the majority of gait recognition datasets, there is a limited appearance variation within each subject. Hence, appearance could be a discriminate cue for identification during training as many subjects can be easily distinguished by their clothes. Unfortunately, any networks or feature extractors relying on appearance will not generalize well on the test set or in practice, due to potentially diverse clothing or appearance between two videos of the same subject. This limitation on training sets also prevents models from learning good feature extractors if solely relying on identification objective.

Therefore, the gait ID system 200 learns to disentangle the gait feature from the visual appearance in an unsupervised manner. Since a video is composed of frames, disentanglement should be conducted on the frame level first. Because there is no dynamic information within a video frame, the gait ID system 200 disentangles the pose feature from the visual appearance for each frame. The dynamics of pose features over a sequence will contribute to the gait feature. In other words, the pose feature is the manifestation of video-based gait feature at a specific frame or point in time.

Therefore, the encoder-decoder network 208 architecture is used with carefully designed loss functions to disentangle the pose feature from appearance feature. The encoder, ε, encodes a feature representation of each frame, I, and explicitly splits it into two parts, namely appearance $f_a$ and pose $f_g$ features:

$$f_a, f_g = \varepsilon(I) \quad (1)$$

These two features are expected to fully describe the original input image. As they can be decoded back to the original input through a decoder D:

$$I = D(f_a, f_g) \quad (2)$$

The functions defined for learning the encoder, ε, and decoder D include cross reconstruction loss and gait similarity loss. The reconstructed I should be close to the original input I. However, enforcing self-reconstruction loss as in a typical autoencoder cannot ensure the appearance $f_a$ learning appearance information across the video and $f_g$ representing pose information in each frame. Therefore, the cross reconstruction loss, using an appearance feature $f_a^{t_1}$ of one frame and pose feature $f_g^{t_2}$ of another one to reconstruct the latter frame:

$$\mathcal{L}_{xrecon} = \left\| (f_a^{t_1}, f_g^{t_2}) - I_{t_2} \right\|_2^2 \quad (3)$$

where $I_t$ is the video frame at the time step t.

The cross reconstruction loss can play a role as the self-reconstruction loss to make sure the two features are sufficiently representative to reconstruct video frames. On the other hand, as a pose feature of a current frame can be paired to the appearance feature of any frame in the same video to reconstruct the same target (using the decoder of the encoder-decoder network 208), it enforces the appearance features to be similar across all frames.

The cross reconstruction loss prevents the appearance feature $f_a$ from being over-represented, containing pose variation that changes between frames. However, appearance information may still be leaked into pose feature $f_g$. In an extreme case, $f_a$ is a constant vector while $f_g$ encodes all the information of a video frame. In an example, to make $f_g$ "cleaner," a gait similarity module 216 receives multiple videos of the same subject. Extra videos can introduce the change in appearance. Given two videos of the same subject with length $n_1$, $n_2$ in two different conditions $c_1$, $c_2$. Ideally, $c_1$, $c_2$ should contain difference in the user's appearance, for example, a change of clothes. In an implementation, only one video per user may be accessible for registration and matching.

While appearance changes, the gait information should be consistent between two videos. Since it's almost impossible to enforce similarity on $f_g$ between video frames as it requires precise frame-level alignment, similarity between two videos' is enforced by averaging pose features using the gait similarity module 216:

$$\mathcal{L}_{gait-sim} = \left\| \frac{1}{n_1} \sum_{t=1}^{n_1} f_g^{(t,c_1)} - \frac{1}{n_2} \sum_{t=1}^{n_2} f_g^{(t,c_2)} \right\|_2^2 \quad (4)$$

Even when appearance and pose information can be disentangled for each video frame, the current feature $f_g$ only contains the walking pose of the person in a specific instance, which can share similarity with another specific instance of a very different person. The gait ID system 200 is looking for discriminative characteristics in a user's walking pattern. Therefore, modeling its temporal change is critical. This is where temporal modeling architectures like the recurrent neural network or LSTM work best.

As mentioned previously, the gait ID system 200 includes a multi-layer LSTM 212 structure to explore spatial (e.g., the shape of a person) and mainly, temporal (e.g., how the trajectory of subjects' body parts changes over time) information on pose features extracted from the input video frames 204 by the encoder-decoder network 208. As shown in FIG. 2, pose features extracted from one video sequence are feed into the three-layer LSTM 212. The output of the LSTM 212 is connected to a classifier C, in this case, a linear classifier is used, to classify the user's identity.

Let $h_t$ be the output of the LSTM 212 at time step t, which is accumulated after feeding t pose features $f_g$ into the LSTM 212:

$$h^t = \text{LSTM}(f_g^1, f_g^2, \ldots, f_g^t) \quad (5)$$

An option for identification is to add the classification loss on top of the LSTM output of the final time step:

$$\mathcal{L}_{id-single} = -\log(C_k(h^n)) \quad (6)$$

which is the negative log likelihood that the classifier C correctly identifies the final output $h^n$ as its identity label k.

By the nature of LSTM, the output $h^t$ is greatly affected by its last input $f_g^t$. Hence the LSTM output, $h^t$, can be varied across time steps. With a desire to obtain a gait feature that can be robust to the stopping instance of a walking cycle, the averaged LSTM output can be used as the gait feature for identification:

$$f_{gait}^t = \frac{1}{t} \sum_{s=1}^{t} h^s \quad (7)$$

The identification loss can be rewritten as:

$$\mathcal{L}_{id-avg} = -\log(C_k(f_{gait}^n)) \quad (8)$$
$$= -\log\left(C_k\left(\frac{1}{n}\sum_{s=1}^{n} h^s\right)\right)$$

The LSTM 212 is expected to learn that the longer the video sequence, the more walking information it processes, then the more confident it identifies the subject. Instead of minimizing the loss on the final time step, all the intermediate outputs of every time step weighted by $w_t$ is used:

$$\mathcal{L}_{id-inc-avg} = \frac{1}{n}\sum_{s=1}^{n} w_t \log\left(C_k\left(\frac{1}{t}\sum_{s=1}^{t} h^s\right)\right) \quad (9)$$

To this end, the overall training loss function is:

$$\mathcal{L} = \mathcal{L}_{id-inc-avg} + \lambda_r \mathcal{L}_{xrecon} + \lambda_s \mathcal{L}_{gait-sim} \quad (10)$$

The gait ID system 200 including the encoder-decoder network 208 and LSTM 212 are jointly trained. Updating ε to optimize $\mathcal{L}_{id\text{-}inc\text{-}avg}$ also helps to further generate pose features that have identity information and on which the LSTM 212 is able to explore temporal dynamics. At the test time, the output $f_{gait}^{t}$ of the LSTM 212 is the gait feature of the video and used as the identity feature representation for matching or verifying an approaching user. The cosine similarity score is used as the metric, as described as a distance metric between a known registered gait feature and present gait feature.

The gait ID system 200 receives video frames 204 with the person of interest segmented. In an example embodiment, the foreground mask is obtained from the state-of-the-art instance segmentation, Mask R-CNN. Instead of using a zero-one mask by hard thresholding, the soft mask returned by the network is kept, where each pixel indicates the probability of it being a person. This is partially due to the difficulty in choosing a threshold. Also, it prevents the loss in information due to the mask estimation error.

Input is obtained by pixel-wise multiplication between the mask and RGB values, which is then resized. In the example embodiment, the encoder-decoder network 208 is a typical CNN. Encoder consisting of 4 stride-2 convolution layers following by Batch Normalization and Leaky ReLU activation. The decoder structure is an inverse of the encoder, built from transposed convolution, Batch Normalization and Leaky ReLU layers.

The final layer has a Sigmoid activation to bring the value into [0; 1] range as the input. The classification part is a stacked 3-layer LSTM 212, which has 256 hidden units in each of cells. Since video lengths are varied, a random crop of 20-frame sequence is applied; all shorter videos are discarded.

Figure 3:
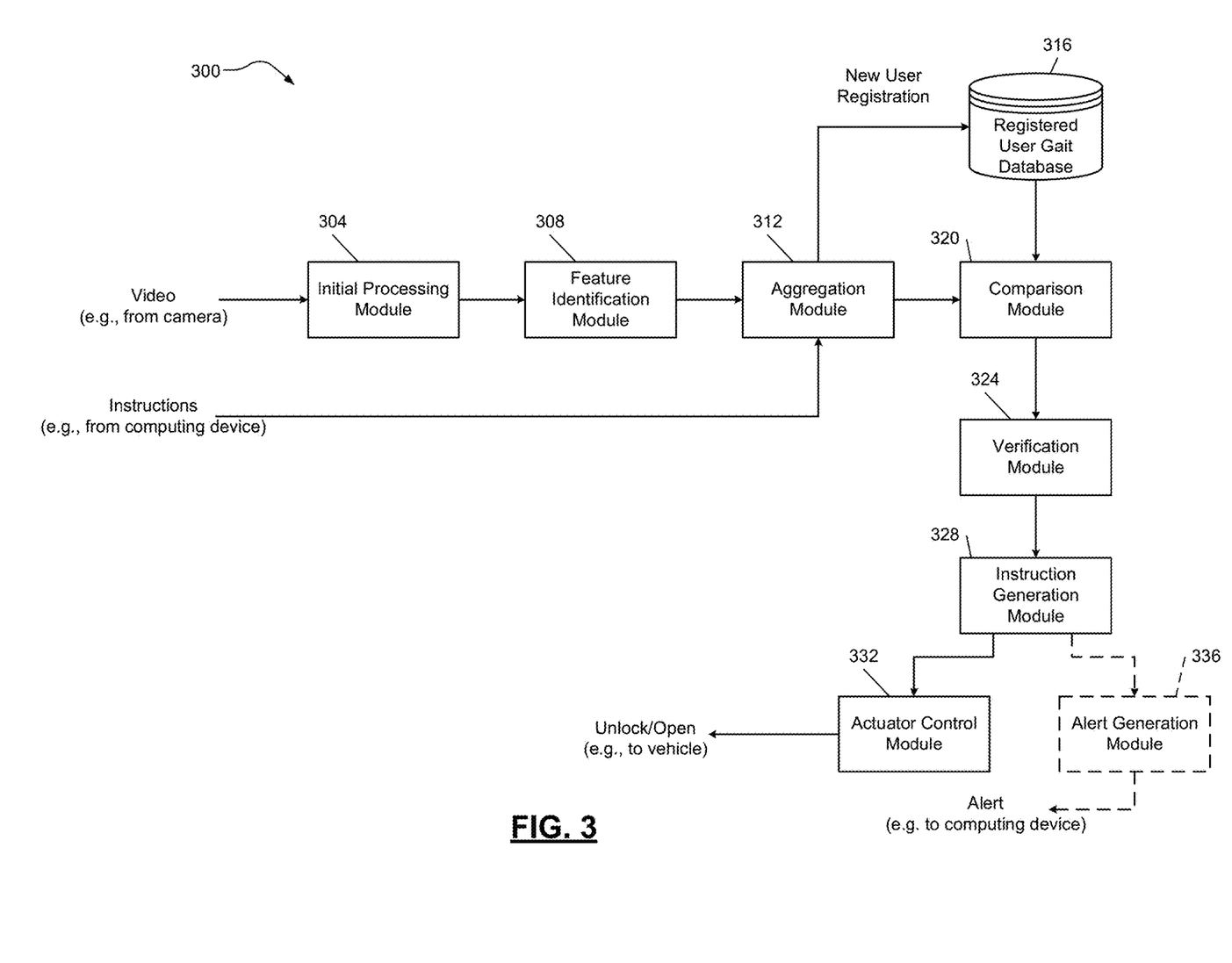
FIG. 3 is an example functional block diagram of an example gait identification (ID) system according to principles of the present disclosure.

Referring now to FIG. 3, a functional block diagram of an example gait identification (ID) system 300 is shown. The gait ID system 300 includes an initial processing module 304 that receives a video as input. The video may be obtained in real time by the camera 112-1 mounted on the vehicle 104 shown in FIG. 1. In various implementations, an instruction may also be input into the gait ID system 300, after pose features are extracted, indicating whether the input video is to register a new user or to authenticate the presently recorded approaching user.

The initial processing module 304 is configured to prepare the received video for feature extraction. As mentioned above, the preparation includes cropping the video, parsing the video into individual frames, removing the background from each frame, etc. As also mentioned previously, each individual frame of the video is analyzed and the pose and appearance features separated for combination of only the pose features of each frame to construct the pose features of the approaching individual captured in the video.

The processed frames of the video are then forwarded to a feature identification module 308. As described above, the feature identification module 308 implements a trained machine learning model that has a similar architecture to the encoder-decoder network of FIG. 2. The feature identification module 308 separates, from each frame, pose and appearance features using the trained machine learning model, such as a CNN model. The feature identification module 308 identifies the appearance feature and removes the appearance feature from each of the frames. As described above with respect to the similarity loss features, the feature identification module 308 may also be configured to enforce similarity between frames of the same individual across multiple videos.

Then, the pose feature of each frame is forwarded to an aggregation module 312. The aggregation module 312 combines the pose features of each frame to generate a mean or averaged gait feature over time. Aggregating the pose feature of each frame is important to create a gait feature of the approaching user walking using a plurality of pose features since each pose feature includes the pose of the approaching user only in a specific instance. The aggregation module 312 may implement an LSTM model that is trained to average pose features from individual pose features. The aggregation module 312 also receives an instruction from, for example, a computing device operated by the user or an operator of the vehicle and/or ride share service, to instruct whether the input video is being used to register a new user or authenticate a present approaching user.

In the example of a ride share service, if a user requests a vehicle through a ride share application, the user can choose to be authenticated based on gait. Alternatively, the ride share service can require such authentication. Then, if the gait ID system 300 implemented by the ride share service does not have any gait information for the user, the user may be registered by the requested vehicle. In such a situation, the operator of the vehicle may request that the user walk toward a camera mounted on the vehicle and the operator instructs the gait ID system 300 that the video is intended to register the user. When first registering, alternative authentication may be used.

In various implementations, a single reference video of the user may be used to register the user or a plurality of videos at different angles under difference conditions may be captured and stored for the user over a period of time. Additionally or alternatively, the user may be registered at a different point other than when first ordering a vehicle. Therefore, when a user is first being registered, the operator of the vehicle including the gait ID system 300 may instruct the system that the present video is being captured for registration purposes of the user requesting the vehicle. Otherwise, the gait ID system 300 may assume (or know based on the user ID) that the user is registered.

When the aggregation module 312 receives an instruction indicating the user is being registered, the aggregation module 312 directs the gait feature to be stored in a registered user gait database 316 corresponding to a user ID of the user. Then, when the user is being authenticated for a future ride request, the gait ID system 300 can access the gait feature of the user from the registered user gait database 316 according to the user ID to verify the user's identity.

Otherwise, if the approaching user is being authenticated as opposed to registered, the aggregation module 312 forwards the constructed present gait feature to a comparison module 320. The comparison module 320 obtains a stored gait feature of the approaching user from the registered user gait database 316 based on a user ID. As mentioned previously, the registered user gait database 316 stores pose features with a corresponding user ID in order to compare the stored pose features to the real time analyzed pose features of approaching users.

The comparison module 320 compares the present gait feature to the stored gait feature by determining a distance value between the two features, for example, a cosine similarity score as a distance metric described previously. The difference between the two pose features is represented as a distance function. Then, the distance is forwarded to a verification module 324 which determines whether the distance is within a predetermined threshold. Then, the verification module 324 forwards an authentication instruction or an instruction that the approaching user is not authenticated to an instruction generation module 328. The instruction generation module 328 sends the authentication instruction to an actuator control module 332 to actuate an actuator on the vehicle, operating to unlock and/or open a particular door of the vehicle when the user has been authenticated.

Otherwise, if the instruction generation module 328 receives the instruction that the approaching user is not authenticated, then an instruction may optionally be sent to an alert generation module 336. The alert generation module 336 may generate and transmit an alert to the computing device operated by the vehicle owner and/or a mobile computing device operated by the approaching user indicating that the user is not authenticated. The alert may be visual, audio, and/or haptic feedback.

Figure 4:
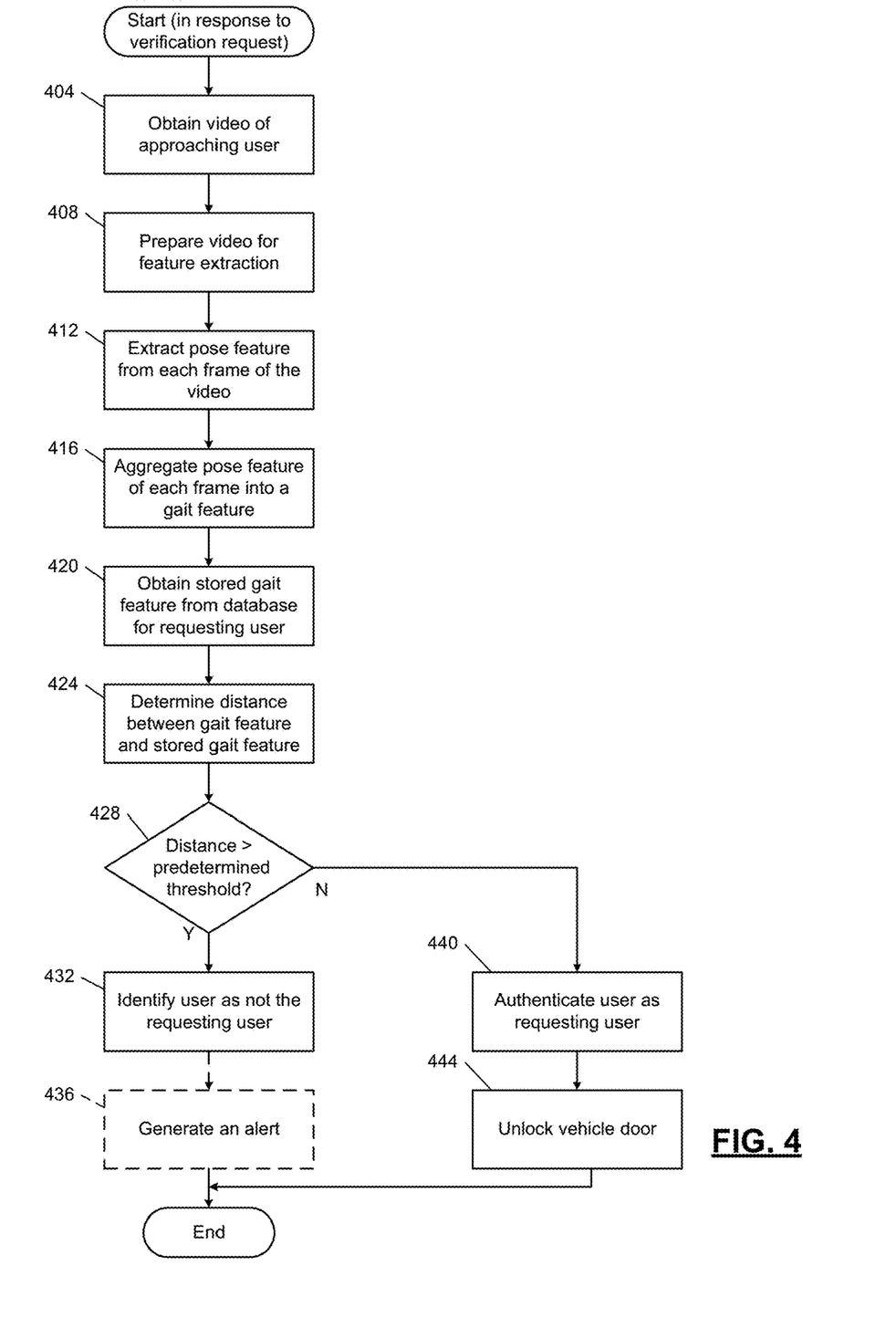
FIG. 4 is an example flowchart depicting example authentication when requesting a ride share vehicle according to principles of the present disclosure.

Referring to FIG. 4, a flowchart depicting example authentication when a user requests a vehicle through a ride share service is shown. Control begins in response to an authentication request. In various implementations, the authentication request may be received each time a user approaches a vehicle expecting a user. For example, after a ride is requested and the vehicle reaches a pick up location, the plurality of cameras mounted on the vehicle may be initiated and capturing users surrounding the vehicle. Once the gait ID system receives a video including a user approaching the vehicle for a predetermined amount of time, for example, if a user has been walking towards the vehicle for 5 seconds, the gait ID system may instruct the camera with the best view of the approaching user feed video captured of the approaching user to be authenticated.

In various implementations, the camera with the best view would be the camera facing the approaching user, the camera angle being parallel with the walking direction of the approaching user. In other implementations, the requested user may perform a particular motion to initiate authentication, such as a wave motion that the initial processing module described in FIG. 3 can identify as a prompt to begin authentication. In additional implementations, the user may indicate using their phone or computing device that the user sees the vehicle and is going to begin approaching, so the gait ID system receives videos for any users surrounding the vehicle and attempts to authenticate all viewed users until one of the approaching users is authenticated.

Once control receives the authentication request, control proceeds to 404 to obtain video of an approaching user. In various implementations, control is receiving video from multiple cameras of multiple individuals at the same time. Therefore, control may be attempting to authenticate various users at the same time. Then, control continues to 408 to prepare the obtained or received video for feature extraction. The preparation may include parsing of the video into multiple frames, removing background pixels, etc. Control then continues to 412 to extract a pose feature vector from each frame of the video. The extraction involves disentangling the pose feature of the frame from the appearance feature of the frame using machine learning. Once extracted, control proceeds to 416 to aggregate the pose feature of each frame to generate a gait feature representing the approaching user in the video. The gait feature is a mean representation of the pose features of each frame over time.

Then, control continues to 420 to obtain a stored gait feature from a database corresponding to the requesting user. The requesting user is the user that requested the vehicle. At 424, control determines a distance between the gait feature and the stored gait feature. Then, at 428, control determines whether the distance is greater than a predetermined threshold. If yes, control has determined that the distance between the gait feature and the stored gait feature is too distant, indicating that the approaching user cannot be authenticated as the requesting user. Therefore, control proceeds to 432 to identify the user as not the requesting user. Control may then optionally proceed to 436 to generate an alert. Then, control ends. In an implementation where the gait ID system is continuously identifying users that are in the vehicle's surrounding environment, an alert may not be necessary and, instead, continuous authentication attempts are performed in response to capturing a user approaching the vehicle.

Otherwise, if at 428 control determines that the distance is less than the predetermined threshold, control proceeds to 440 to authenticate the approaching user as the requesting user. This is because the distance indicates that the gait feature and the stored gait feature of the requesting user are similar enough to verify the identity of the approaching user. Then, control proceeds to 444 to send an instruction to unlock the vehicle. In various implementations, control may instead send a verification to a computing device of the vehicle operator and indicate a direction or location of the authenticated user. Then, control ends.

Figure 5:
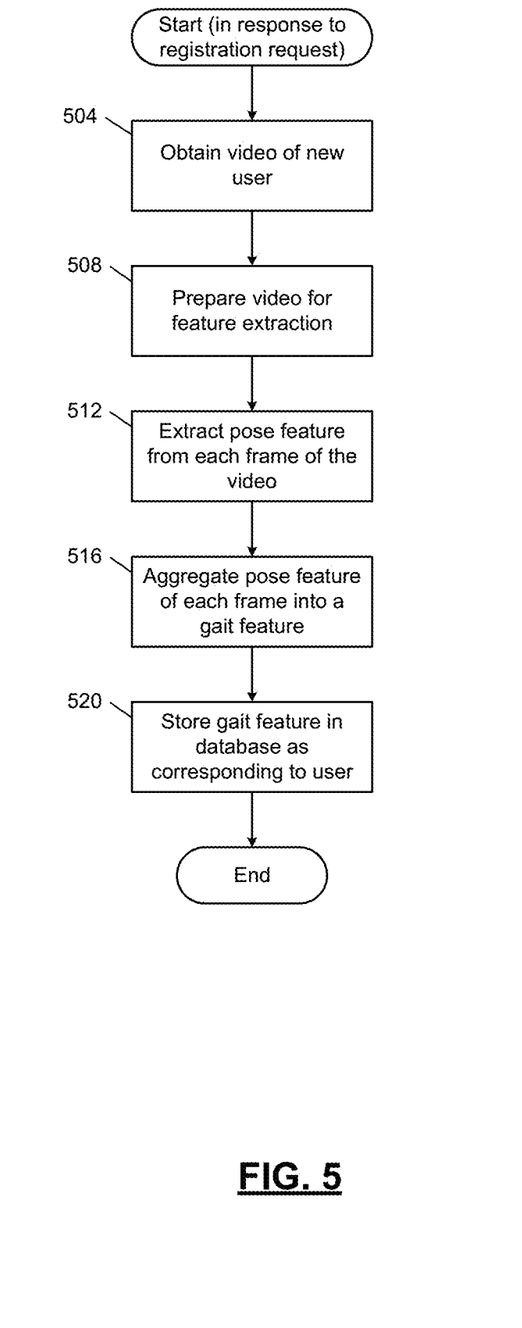
FIG. 5 is an example flowchart depicting example generation and storage of a registered user reference gait feature according to principles of the present disclosure.

Referring to FIG. 5, a flowchart depicting example generation of a registered user reference gait feature is shown. Control begins in response to receiving a registration request. As described above, a new user can register when first requesting the ride share service. Registering involves allowing the capture of a frontal view video of the user walking toward a camera for gait feature extraction.

At 504, control obtains a video of the new user. Then, at 508, control prepares the video for feature extraction. As mentioned previously, this preparation includes parsing the video into frames as well as removing background pixels from each frame. The preparation may further include cropping the video to only include a predetermined number of frames.

At 512, control extracts a pose feature vector from each frame of the video of the new user. Control continues to 516 to aggregate the pose feature of each frame into a gait feature vector over time. Then, control proceeds to 520 to store the gait feature vector in the database as corresponding to the now registered user. Then, when authenticating an approaching user, the gait ID system can access the database of registered users. Then, control ends.

The techniques described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

Some portions of the above description present the techniques described herein in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the described techniques include process steps and instructions described herein in the form of an algorithm. It should be noted that the described process steps and instructions could be embodied in software, firmware or hardware, and when embodied in software, could be downloaded to reside on and be operated from different platforms used by real time network operating systems.

The present disclosure also relates to an apparatus for performing the operations herein. This apparatus may be specially constructed for the required purposes, or it may comprise a computer selectively activated or reconfigured by a computer program stored on a computer readable medium that can be accessed by the computer. Such a computer program may be stored in a tangible computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various systems may also be used with programs in accordance with the teachings herein, or it may prove convenient to construct more specialized apparatuses to perform the required method steps. The required structure for a variety of these systems will be apparent to those of skill in the art, along with equivalent variations. In addition, the present disclosure is not described with reference to any particular programming language. It is appreciated that a variety of programming languages may be used to implement the teachings of the present disclosure as described herein.

The term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip. While various embodiments have been disclosed, other variations may be employed. All of the components and function may be interchanged in various combinations. It is intended by the following claims to cover these and any other departures from the disclosed embodiments which fall within the true spirit of this invention.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. An authentication system, comprising:
    a camera configured to capture two or more images of an unknown person walking;
    a feature extractor configured to receive the two or more images and, for each image in the two or more images, operates to extract a set of appearance features and a set of pose features, such that the appearance features are indicative of visual appearance of the unknown person and the pose features are indicative of pose of the unknown person, wherein the feature extractor is a neural network trained to disentangle the pose features from the appearance features;
    an aggregator configured to receive multiple sets of pose features from the feature extractor and generate a gait feature for the unknown person;
    a data store configured to store a plurality of gait features, where each gait feature in the plurality of gait features is associated with a known person; and
    a classifier configured to receive the gait feature from the aggregator and operates to identify the unknown person by comparing the gait feature to the plurality of gait features stored in the data store.

2. The authentication system of claim 1 further comprises a pre-processor interposed between the camera and the feature extractor, and operates to remove background from each of the two or more images.

3. The authentication system of claim 1 wherein the neural network is further defined as a convolutional neural network.

4. The authentication system of claim 1 wherein neural network is trained using cross reconstruction loss.

5. The authentication system of claim 1 wherein neural network is trained by comparing a given image from the two or more images with a reconstructed image, where the reconstructed image was reconstructed using a set of pose features from one image in the two or more images and appearance features from another image in the two or more images.

6. The authentication system of claim 1 wherein aggregator is further defined as a long short-term memory.

7. The authentication system of claim 1 wherein the classifier averages output from the long short-term memory over time.

8. The authentication system of claim 1 wherein the classifier compares the gait feature to the plurality of gait features by computing a cosine similarity score.

9. The authentication system of claim 1 further comprises a verification module and an actuator, wherein the verification module receives an identity for the unknown person from the classifier and actuates the actuator based on the identity of the unknown person.

10. A computer-implemented method for authenticating a person, comprising:
    capturing, by a camera, a video of an unknown person walking;
    parsing, by an image processor, the video into two or more image frames;
    for each image in the two or more images, disentangling, by the image processor, a set of pose features from a set of appearance features, such that the appearance features are indicative of visual appearance of the unknown person and the pose features are indicative of pose of the unknown person;

generating, by the image processor, a gait feature for the unknown person from the multiple sets of pose features; and identifying, by the image processor, the unknown person by comparing the gait feature for the unknown person to a plurality of gait features, where each gait feature in the plurality of gait features is associated with a known person.

11. The computer-implemented method of claim 10 further comprises removing background from each of the two or more images before the step of disentangling.

12. The computer-implemented method of claim 10 further comprises disentangling a set of pose features from a set of appearance features using a neural network.

13. The computer-implemented method of claim 12 further comprises training the neural network using cross reconstruction loss.

14. The computer-implemented method of claim 12 further comprises training the neural network by comparing a given image from the two or more images with a reconstructed image, where the reconstructed image was reconstructed using a set of pose features from one image in the two or more images and appearance features from another image in the two or more images.

15. The computer-implemented method of claim 12 further comprises receiving another video of the unknown person walking; from images comprising the another video, disentangling a second set of pose features; and training the neural network by enforcing similarity between the set of pose features and the second set of pose features.

16. The computer-implemented method of claim 10 wherein generating a gait feature for the unknown person from the multiple sets of pose features further comprises aggregating the multiple sets of pose features using a long short-term memory and averaging output from the long short-term memory over time.

17. The computer-implemented method of claim 1 further comprises training the long short-term memory using a loss function and the loss function is defined as negative log likelihood that a classifier correctly identifies output of the long short-term memory.

18. The computer-implemented method of claim 10 further comprises comparing the gait feature for the unknown person to a plurality of gait features by computing a cosine similarity score.

19. The computer-implemented method of claim 10 further comprises actuating an actuator based on the identity of the unknown person.

* * * * *